(12) United States Patent  (10) Patent No.: US 8,235,458 B2
Mori  (45) Date of Patent: Aug. 7, 2012

(54) SKELETON STRUCTURE OF VEHICLE

(75) Inventor: Takeo Mori, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/128,814

(22) PCT Filed: Mar. 2, 2009

(86) PCT No.: PCT/JP2009/053884
§ 371 (c)(1),
(2), (4) Date: May 11, 2011

(87) PCT Pub. No.: WO2010/100717
PCT Pub. Date: Sep. 10, 2010

(65) Prior Publication Data
US 2011/0304175 A1  Dec. 15, 2011

(51) Int. Cl.
B60N 99/00 (2006.01)
(52) U.S. Cl. .................................. 296/193.06
(58) Field of Classification Search ............ 296/187.12, 296/193.05, 193.06
See application file for complete search history.

(56) References Cited

U.S. PATENT DOCUMENTS 6,702,368 B1 * 3/2004 Hanyu ..................... 296/193.06
6,789,840 B2 * 9/2004 Honma et al. ........... 296/203.03
7,070,228 B2 * 7/2006 Shimizu et al. .......... 296/187.01
7,560,003 B2 * 7/2009 Naughton et al. .............. 156/91
7,914,068 B2 * 3/2011 Mizohata ................. 296/193.06

FOREIGN PATENT DOCUMENTS

JP 4-119282 U 10/1992
JP 2000-118441 A1 4/2000
JP 2002-347655 A1 12/2002
JP 2005-014716 A1 1/2005

OTHER PUBLICATIONS

International Preliminary Report on Patentability issued Sep. 22, 2011 for counterpart application PCT/JP2009/053884.

* cited by examiner

Primary Examiner — Lori Lyjak
(74) Attorney, Agent, or Firm — Sughrue Mion, PLLC

(57) ABSTRACT

Provided is a side part structure of a vehicle capable of efficiently suppressing deformation of a rocker using a center pillar when the rocker begins to buckle due to a load transmitted from the center pillar to the rocker in the event of a side collision or the like, so that the deformation amount of the rocker may be decreased.
The side part structure of the vehicle includes a center pillar 2 that extends in the vertical direction, and the lower end of the center pillar 2 is connected to a rocker 1 that extends in the longitudinal direction. A portion bonded to the rocker 1 in the center pillar 2 is provided with a front ridge line 24 and a rear ridge line 25 respectively located at the front and rear sides of the vehicle, and the front ridge line 24 and the rear ridge line 25 are both formed toward the center portion of the width direction of the center pillar 2 and become close to each other as they go downward.

4 Claims, 7 Drawing Sheets (a)

(b)

(a)

(b)

SKELETON STRUCTURE OF VEHICLE

CROSS REFERENCE TO RELATED APPLICATION

This application is a National Stage of International Application No. PCT/JP2009/053884 filed Mar. 2, 2009, the contents of all of which are incorporated herein by reference in their entirety.

TECHNICAL FIELD

The present invention relates to a side part structure of a vehicle, and particularly, to a side part structure of a vehicle in a bonding portion between a center pillar and a rocker.

BACKGROUND ART

For example, a center pillar and a rocker are connected to each other at a side part in a substantially center position of a vehicle in the longitudinal direction. As the side part structure of the vehicle, for example, there is known a side part structure of a vehicle shown in FIG. 7. The side part structure of the vehicle shown in FIG. 7 is provided with a center pillar 71 that extends from a side part of a vehicle in the vertical direction. Further, the lower end of the center pillar 71 is connected to a rocker 72 that extends in the longitudinal direction. Further, in the connection portion between the center pillar 71 and the rocker 72, the surface of the rocker 72 is covered at the lower end of the center pillar 71.

Further, in the side part structure of the vehicle, a method has been examined which decreases the deformation amount of an interior of a vehicle by distributing collision energy to an entire vehicle body through a front door or a center pillar when a side collision occurs in the vehicle. For this reason, for example, as a reinforcement member of the center pillar, there is known a pillar reinforcement structure including a pillar reinforcement having a thick plate portion disposed at the upper side of the length direction of the center pillar and a thin plate portion disposed at the lower side thereof and having a thickness thinner than that of the thick plate portion (for example, refer to Patent Literature 1). In the pillar reinforcement structure, a bonding portion between the thick plate portion and the thin plate portion is located at a bottom position of the center pillar. Further, as for the pillar reinforce, an inner member is disposed to extend in the vertical direction over the bonding portion, and the lower end of the inner member is disposed between the bonding portion and the rocker portion.
Patent Literature 1: JP-A-2002-347655

SUMMARY OF INVENTION

Technical Problem

However, in the pillar reinforcement structure disclosed in Patent Literature 1, the lower end of the center pillar 71 faces the longitudinal direction of the vehicle. For this reason, when a side collision occurs in the vehicle so that a load is input to the center pillar 71, the load transmitted from the center pillar 71 to the rocker 72 is present at the outside of the range where the center pillar 71 is provided in the rocker 72. For this reason, there is a problem in that the deformation caused by the buckling of the rocker 72 may not be sufficiently suppressed by the center pillar 71, so that the deformation amount of the rocker increases.

Therefore, an object of the invention is to provide a side part structure of a vehicle capable of efficiently suppressing deformation of a rocker using a center pillar when the rocker begins to buckle due to a load transmitted from the center pillar to the rocker in the event of a side collision or the like, so that the deformation amount of the rocker may be decreased.

Solution to Problem

In order to solve the above-described problem, a side part structure of a vehicle of the invention includes: a center pillar which extends from a side part of a vehicle in the vertical direction; and a rocker which is connected to the lower end of the center pillar and extends in the longitudinal direction, wherein a portion bonded to the rocker in the center pillar is provided with two ridge lines respectively located at the front and rear sides of the vehicle, and wherein the two ridge lines are formed toward a center portion of the width direction of the center pillar as they go downward so that the two ridge lines become close to each other.

In the side part structure of the vehicle according to the invention, the two ridge lines respectively located at the front and rear sides of the vehicle of the portion bonded to the rocker in the center pillar are formed toward the center portion of the width direction of the center pillar and become close to each other as they go downward. For this reason, when a load is transmitted from the center pillar to the rocker so that the rocker begins to buckle, the buckling point of the rocker is within the range of the center pillar. Accordingly, the deformation of the rocker may be efficiently suppressed by the center pillar when the rocker begins to buckle due to a load transmitted from the center pillar to the rocker in the event of a side collision or the like, so that the deformation amount of the rocker may be decreased.

Further, in order to solve the above-described problem, a side part structure of the vehicle of the invention includes: a center pillar which extends from a side part of a vehicle in the vertical direction; and a rocker which is connected to the lower end of the center pillar and extends in the longitudinal direction, wherein a weak portion used as a start point causing buckling of the rocker is formed at a lower position at the outside of the width direction of the vehicle and within a connection range of the center pillar in the rocker.

In the side part structure of the vehicle according to the invention, the weak portion used as the start point causing buckling of the rocker is formed at the lower position at the outside of the width direction of the vehicle and within the connection range of the center pillar in the rocker. For this reason, when a load is transmitted from the center pillar to the rocker so that the rocker begins to buckle, the buckling point of the rocker becomes a weak portion. Since the weak portion is formed within the range of the center pillar, the deformation of the rocker may be efficiently suppressed by the center pillar when the rocker begins to buckle due to a load transmitted from the center pillar to the rocker in the event of a side collision or the like, so that the deformation amount of the rocker may be decreased.

Here, the weak portion may be a bead formed in the rocker.

Likewise, since the weak portion is the bead formed in the rocker, the weak portion may be easily formed.

Further, the weak portion may be formed as a thin plate of which the thickness is thinner than those of the other portions in the rocker.

Likewise, since the weak portion is formed as the thin plate of which the thickness is thinner than those of the other portions in the rocker, the weak portion may be easily formed.

Advantageous Effects of Invention

According to the side part structure of the vehicle of the invention, the deformation of the rocker may be efficiently suppressed by the center pillar when the rocker begins to buckle due to a load transmitted from the center pillar to the rocker in the event of a side collision or the like, so that the deformation amount of the rocker may be decreased.

Figure 1:
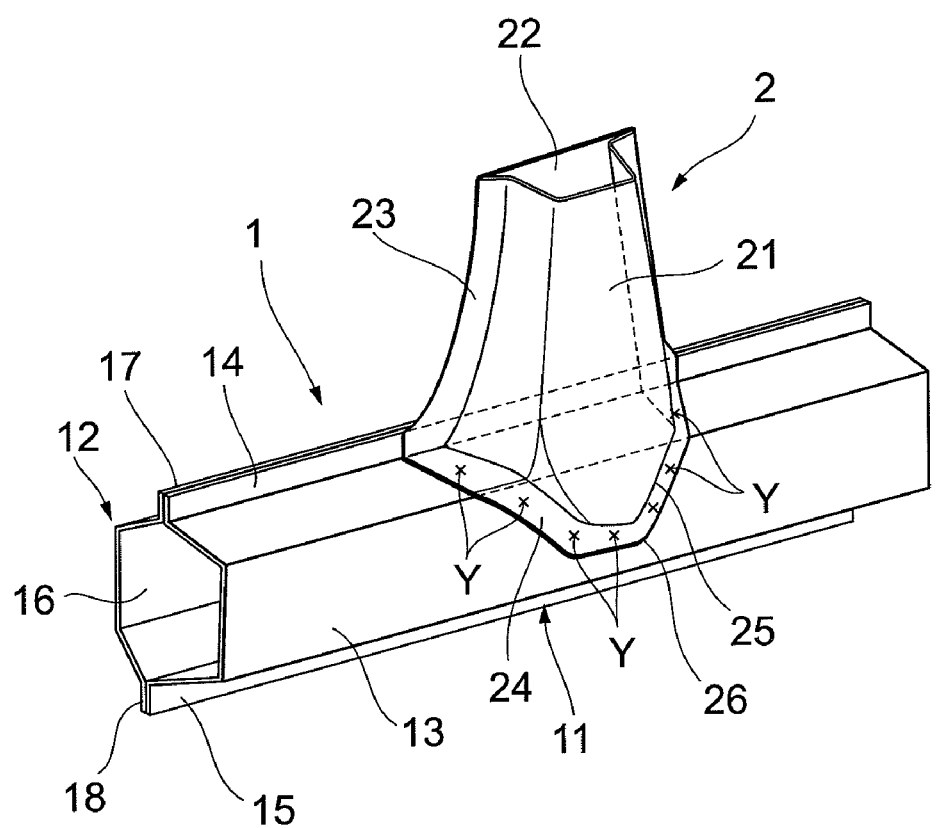
FIG. 1 is a perspective view illustrating a side part structure of a vehicle according to a first embodiment.

REFERENCE SIGNS LIST 1, 3, 5: ROCKER
2, 4, 6: CENTER PILLAR
11: ROCKER OUTER MEMBER
12: ROCKER INNER MEMBER
13: ROCKER OUTER MEMBER BODY
14: OUTER UPPER FLANGE
15: OUTER LOWER FLANGE
16: ROCKER INNER MEMBER BODY
17: INNER UPPER FLANGE
18: INNER LOWER FLANGE
21: PILLAR OUTER MEMBER
22: PILLAR INNER MEMBER
23: VERTICAL FLANGE MEMBER
24: FRONT RIDGE LINE
25: REAR RIDGE LINE
26: LOWER FLANGE
39: BUCKLING BEAD
53: ROCKER OUTER MEMBER BODY
53A: UPPER SURFACE
53B: SIDE SURFACE
53C: LOWER SURFACE
53D: UPPER OUTER SURFACE
53E: LOWER OUTER SURFACE
F: COLLISION ENERGY
L: LOAD
W: BUCKLING POINT
Y, Y1~Y5: WELDING POINT
YC: LOWER END WELDING POINT

DESCRIPTION OF EMBODIMENTS

Hereinafter, exemplary embodiments of the invention will be described by referring to the accompanying drawings. Furthermore, the same reference numerals will be given to the same components in the description of the drawings, and the repetitive description thereof will be omitted. Further, for convenience of description in the drawings, the scales of the drawings do not match the actual scales in some cases.

FIG. 1 is a perspective view illustrating a side part structure of a vehicle according to a first embodiment. As shown in FIG. 1, the side part structure of the vehicle according to the embodiment includes a rocker 1 that extends in the longitudinal direction of the vehicle. Further, the side part structure of the vehicle includes a center pillar 2 that extends in the vertical direction of the vehicle. The center pillar 2 extends from the side part of the vehicle in the vertical direction. Further, the lower end of the center pillar 2 is connected to the rocker 1.

The rocker 1 includes a rocker outer member 11 disposed at the outside of the vehicle and a rocker inner member 12 disposed at the inside of the vehicle. The rocker outer member 11 includes a rocker outer member body 13 that extends in the longitudinal direction of the vehicle, and the upper and lower portions of the rocker outer member body 13 are respectively provided with an outer upper flange 14 and an outer lower flange 15 that extend in the longitudinal direction of the vehicle. Further, the rocker inner member 12 includes a rocker inner member body 16 that extends in the longitudinal direction of the vehicle, and the upper and lower portions of the rocker inner member body 16 are respectively provided with an inner upper flange 17 and an inner lower flange 18 that extend in the longitudinal direction of the vehicle.

By welding the outer upper flange 14 to the inner upper flange 17 and welding the outer lower flange 15 to the inner lower flange 18, the rocker outer member 11 and the rocker inner member 12 are integrated. Further, the cross-section of the rocker body portion including the rocker outer member body 13 and the rocker inner member body 16 in the rocker 1 is formed in a substantially hexagonal shape.

The center pillar 2 includes a pillar outer member 21 that is disposed at the outside of the vehicle and has a substantially U-shaped cross-section and a pillar inner member 22 that is disposed at the inside of the vehicle. The pillar outer member 21 and the pillar inner member 22 both extend in the vertical direction. Further, the side edge of the pillar outer member 21 is provided with a vertical flange member 23. The vertical flange member 23 also extends in the vertical direction.

The vertical flange member 23 is integrated with the pillar outer member 21, and the pillar inner member 22 is welded to the vertical flange member 23, so that the pillar outer member 21 and the pillar inner member 22 are bonded to each other. Further, the inner surface of the vehicle at the lower end of the pillar inner member 22 is bonded by welding to the outer upper flange 14 of the rocker 1.

Furthermore, the lower end of the pillar outer member 21 is provided with two ridge lines, that is, a front ridge line 24 and a rear ridge line 25 that are respectively located at the front and rear sides of the vehicle. The inner side of the vehicle of the front ridge line 24 is located at the front side of the vehicle, and is disposed to move to the rear side of the vehicle as it moves downward. Further, the rear ridge line 25 at the inner side of the vehicle is located at the rear side of the vehicle, and is disposed to move to the front side of the vehicle as it moves downward. Likewise, the front ridge line 24 and the rear ridge line 25 are both formed toward the center portion of the width direction of the center pillar, and are formed to be close to each other as they go downward.

Further, the lower end of the pillar outer member 21 is provided with a lower flange 26. The lower flange 26 is formed along the edge of the lower end surface in the pillar outer member 21. The lower flange 26 is bonded by welding to a portion between the upper surface and the side surface of the rocker outer member body 13 in the rocker 1 at a plurality of welding points Y. The portion bonded to the rocker in the center pillar includes the lower end surface of the pillar outer member 21 and the lower flange 26.

The plurality of welding points Y is symmetrically disposed about the center position of the width direction of the center pillar 2. Further, the front ridge line 24 and the rear ridge line 25 are merged with the center position of the width direction of the center pillar 2. As the center position of the width direction of the center pillar 2, the welding point Y is also disposed at the side portion of the merging position of the front ridge line 24 and the rear ridge line 25.

An operation of the side part structure of the vehicle according to the embodiment having the above-described configuration will be described. In the side part structure of the vehicle according to the embodiment, when a side collision occurs in the vehicle, collision energy E is input to the center pillar 2. The collision energy E input to the center pillar 2 is transmitted to the rocker 1 in the form of a load L, and is distributed to the entire vehicle body through the rocker 1.

Figure 2:
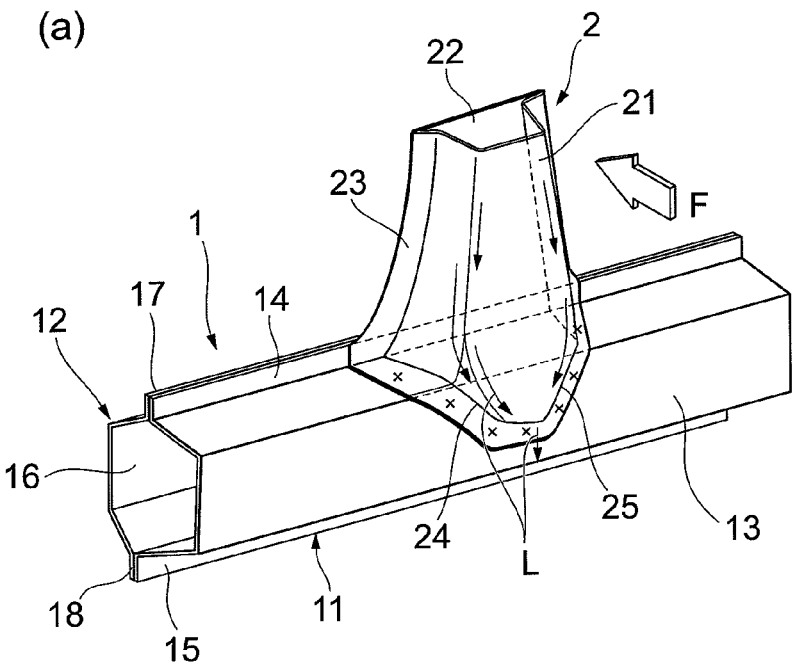
FIG. 2A is a perspective view illustrating a flow of a load in the side part structure of the vehicle according to the embodiment.
FIG. 2B is a perspective view illustrating a buckling point where a rocker begins to buckle.
Figure 2:
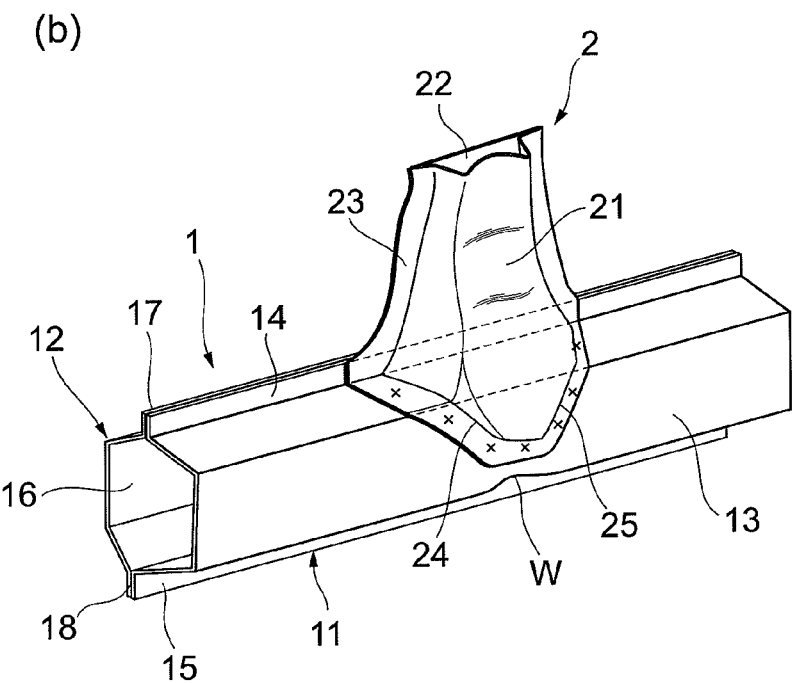

Here, when the load is transmitted from the center pillar 2 to the rocker 1, the load L is transmitted to the rocker 1 along the ridge line of the center pillar 2 as shown in FIG. 2. In the side part structure of the vehicle according to the embodiment, the front ridge line 24 and the rear ridge line 25 of the center pillar 2 are both formed toward the center portion of the width direction of the center pillar 2 and become close to each other as they go downward. Further, the front ridge line 24 and the rear ridge line 25 are merged with the substantially center position of the width direction of the center pillar 2.

Figure 3:
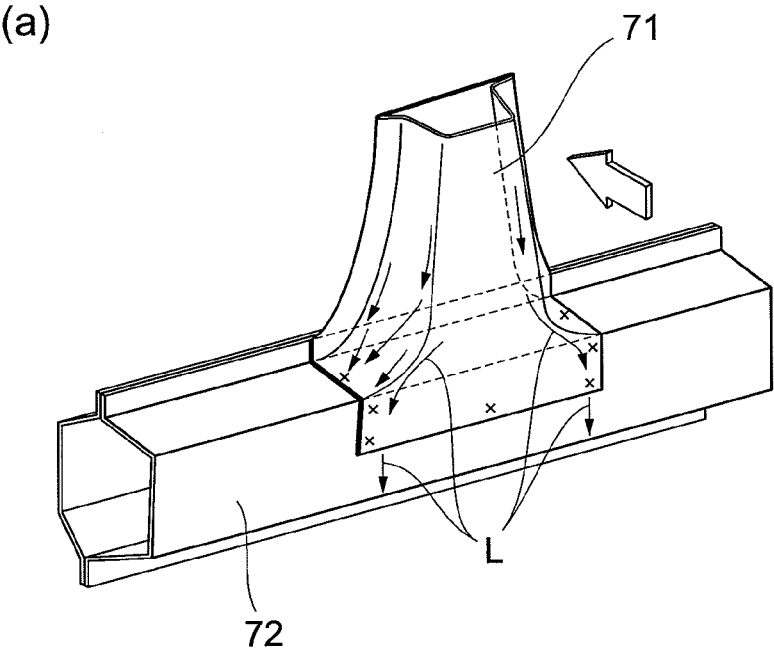
FIG. 3A is a perspective view illustrating a flow of a load in the existing side part structure of the vehicle.
FIG. 3B is a perspective view illustrating a buckling point where a rocker begins to buckle.
Figure 3:
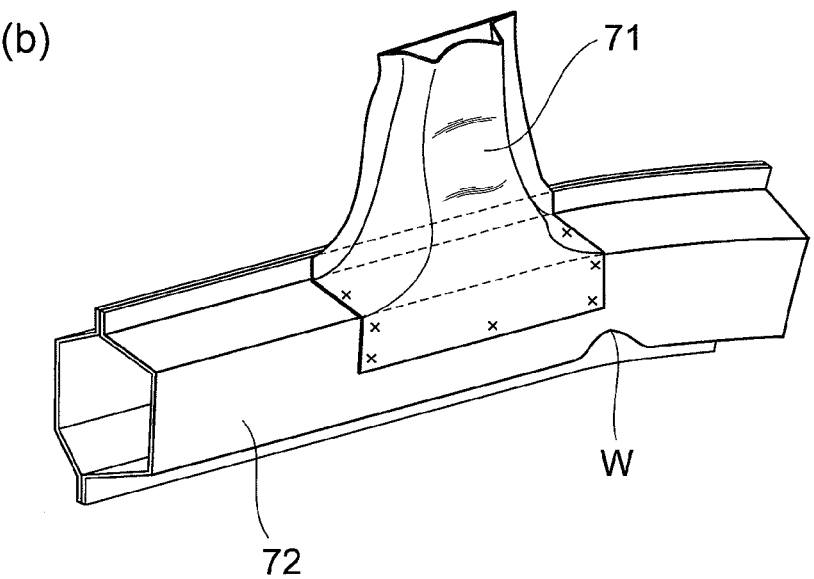

For this reason, as shown in FIG. 2B, the load L is transmitted from the center pillar 2 to the rocker 1 so that the rocker 1 begins to buckle, a buckling point W of the rocker 1 is located at the substantially center position of the width direction of the center pillar 2. On the contrary, for example, in an existing center pillar 71 shown in FIG. 7, when a load L is transmitted from a center pillar 71 to a rocker 72 so that the rocker 72 begins to buckle as shown in FIG. 3A, the buckling point W of the rocker 72 is located at a position deviated from the range provided with the center pillar 71 as shown in FIG. 3B.

Figure 4:
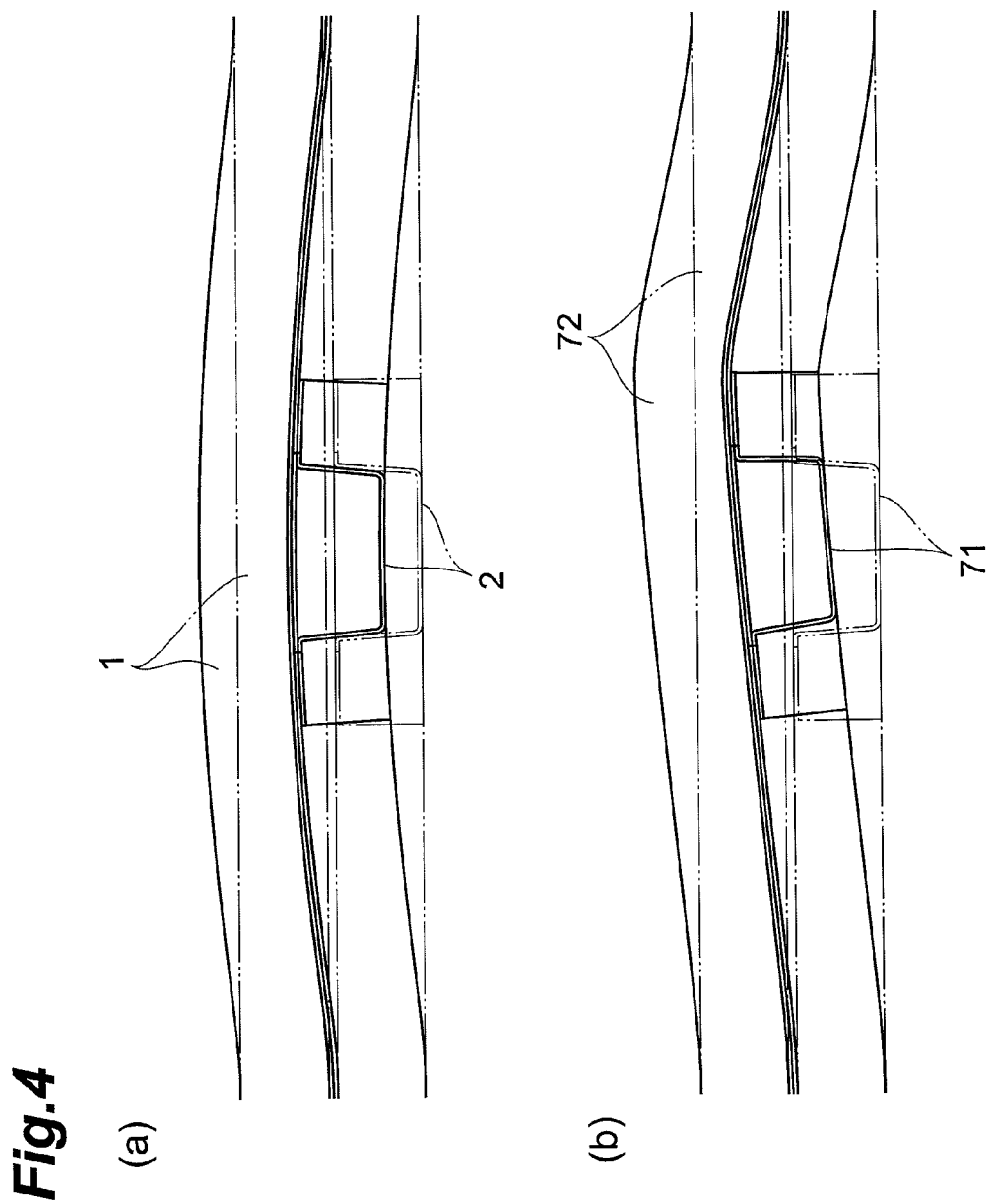
FIG. 4A is a plan view illustrating a buckling state of the rocker in the side part structure of the vehicle according to the embodiment.
FIG. 4B is a plan view illustrating a buckling state of the rocker in the existing side part structure of the vehicle.
Figure 7:
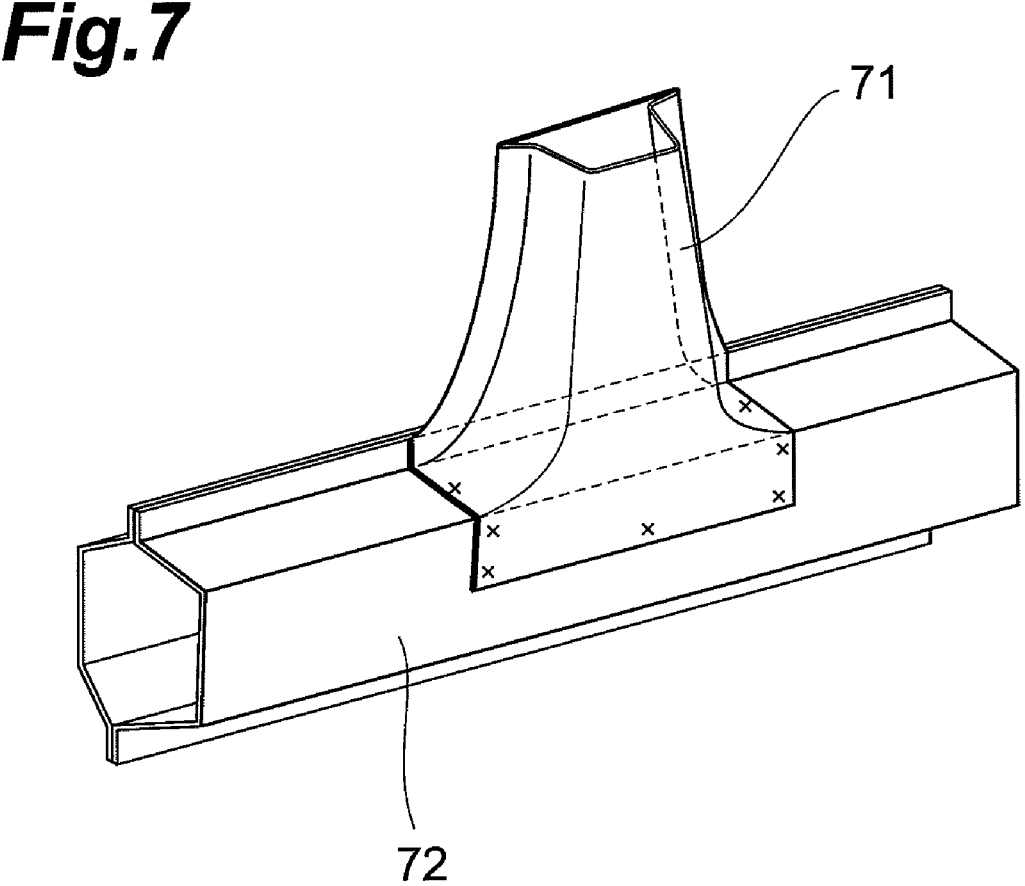
FIG. 7 is a perspective view illustrating the existing side part structure of the vehicle.

Accordingly, in the existing side part structure of the vehicle shown in FIG. 7, since the buckling point W of the rocker 72 is located at the outside of the range provided with the center pillar 71 as shown in FIG. 4B, a force of suppressing the rocker 72 using the center pillar 71 decreases. As a result, the deformation amount of the rocker 72 increases. On the contrary, in the side part structure of the vehicle according to the embodiment, since the buckling point W of the rocker 1 is located at the substantially center position of the width direction of the center pillar 2 as shown in FIG. 4A, the buckling of the rocker 1 may be appropriately suppressed by the center pillar 2.

Figure 5:
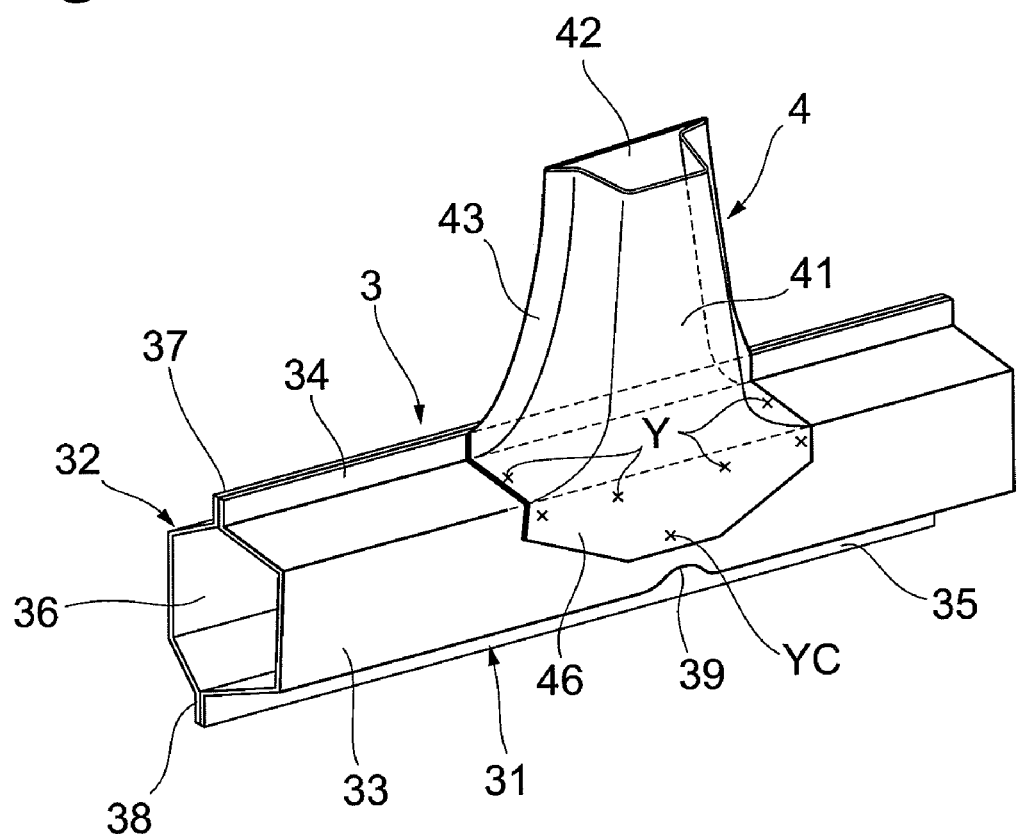
FIG. 5 is a perspective view illustrating the side part structure of the vehicle according to a second embodiment.

Next, a second embodiment of the invention will be described. FIG. 5 is a perspective view illustrating the side part structure of the vehicle according to the second embodiment. As shown in FIG. 5, the side part structure of the vehicle according to the embodiment includes a rocker 3 that extends in the longitudinal direction of the vehicle. Further, the side part structure of the vehicle includes a center pillar 4 that extends in the vertical direction of the vehicle. The center pillar 4 extends from tie side part of the vehicle in the vertical direction. Further, the lower end of the center pillar 4 is connected to the rocker 3.

As in the first embodiment, the rocker 3 includes a rocker outer member 31 and a rocker inner member 32, and the rocker outer member 31 includes a rocker outer member body 33. The upper and lower portions of the rocker outer member body 33 are respectively provided with an outer upper flange 34 and an outer lower flange 35. Further, the rocker inner member 32 includes a rocker inner member body 36, and the upper and lower portions of the rocker inner member body 36 are respectively provided with an inner upper flange 37 and an inner lower flange 38.

Furthermore, a buckling bead 39 serving as a weak portion used as a start point causing the buckling of the rocker 3 is provided at a position within the range where the center pillar 4 is provided in the rocker outer member body 33 of the rocker outer member 31 and at the substantially center position of the width direction of the center pillar 4. The buckling bead 39 is formed in a manner such that the lower ridge line outside the vehicle of the rocker outer member body 33 is formed in a recess shape.

Further, the center pillar 4 includes a pillar outer member 41 that is disposed at the outside of the vehicle and has a substantially U-shaped cross-section and a pillar inner member 42 that is disposed at the inside of the vehicle. The pillar outer member 41 and the pillar inner member 42 both extend in the vertical direction. Further, the side edge of the pillar outer member 41 is provided with a vertical flange member 43. The vertical flange member 43 also extends in the vertical direction.

The vertical flange member 43 is integrated with the pillar outer member 41, the pillar inner member 42 is welded to the vertical flange member 43, so that the pillar outer member 41 and the pillar inner member 42 are bonded to each other. Further, the inner surface of the vehicle at the lower end of the pillar inner member 42 is bonded by welding to the outer upper flange 34 of the rocker 3.

Further, the lower end of the pillar outer member 41 is provided with a lower flange 46. The shape of the surface bonded to the outer surface of the rocker outer member body 33 in the lower flange 46 is formed in a substantially trapezoid shape of which the upper side is longer than the lower side. The lower flange 46 is bonded by welding to a portion between the upper surface and the side surface of the rocker outer member body 33 of the rocker 3 at a plurality of welding points Y. Here, in the surface bonded to the outer surface of the rocker outer member body 33 in the lower flange 46, the plurality of welding points Y is disposed in parallel along the upper side at a position around the upper side. Furthermore, a lower end welding point YC is provided at a position around the lower side to be located at the substantially center position of the width direction of the center pillar 4. The lower end welding point YC provided at the substantially center position of the width direction of the center pillar 4 and the buckling bead 39 formed in the rocker outer member body 33 are close to each other. In this way, the lower end welding point YC is disposed at a position closer to the buckling bead 39 than any position of the outer ridge line of the vehicle in the rocker outer member body 33.

In the side part structure of the vehicle according to the embodiment having the above-described configuration, when a side collision occurs in the vehicle, collision energy is input to the center pillar 4. The collision energy input to the center pillar 4 is transmitted to the rocker 3 in the form of a load, and is distributed to the entire vehicle body through the rocker 3.

Here, the lower end welding point YC between the rocker 3 and the center pillar 4 is close to the buckling bead 39 formed in the rocker 3. Further, the lower end welding point YC is disposed to be closer to the buckling bead 39 than any position of the outer ridge line of the vehicle in the rocker outer member body 33.

Accordingly, the load is transmitted from the center pillar 4 to the buckling head 39 earlier than any position of the outer ridge line of the vehicle in the rocker outer member body 33 of the rocker 3. Likewise, since the load is transmitted to the buckling bead 39 earlier than any position of the outer ridge line of the vehicle in the rocker outer member body 33, the rocker 3 is buckled about the buckling bead 39. At this time, the buckling bead 39 is disposed at a position within the range provided with the center pillar 4 and the substantially center position of the width direction of the center pillar 4. Accordingly, the buckling of the rocker 3 may be appropriately suppressed by the center pillar 4.

Furthermore, in the embodiment, the buckling bead 39 is formed as the weak portion at the substantially enter position of the width direction of the center pillar 4 of the rocker outer member body 33, but the weak portion may be formed a perforation portion instead of the buckling bead 39. Alternatively, the weak portion may be formed in a manner such that the thickness of the weak portion is thinner than those of the other portions or the rigidity of the other portions is improved.

Figure 6:
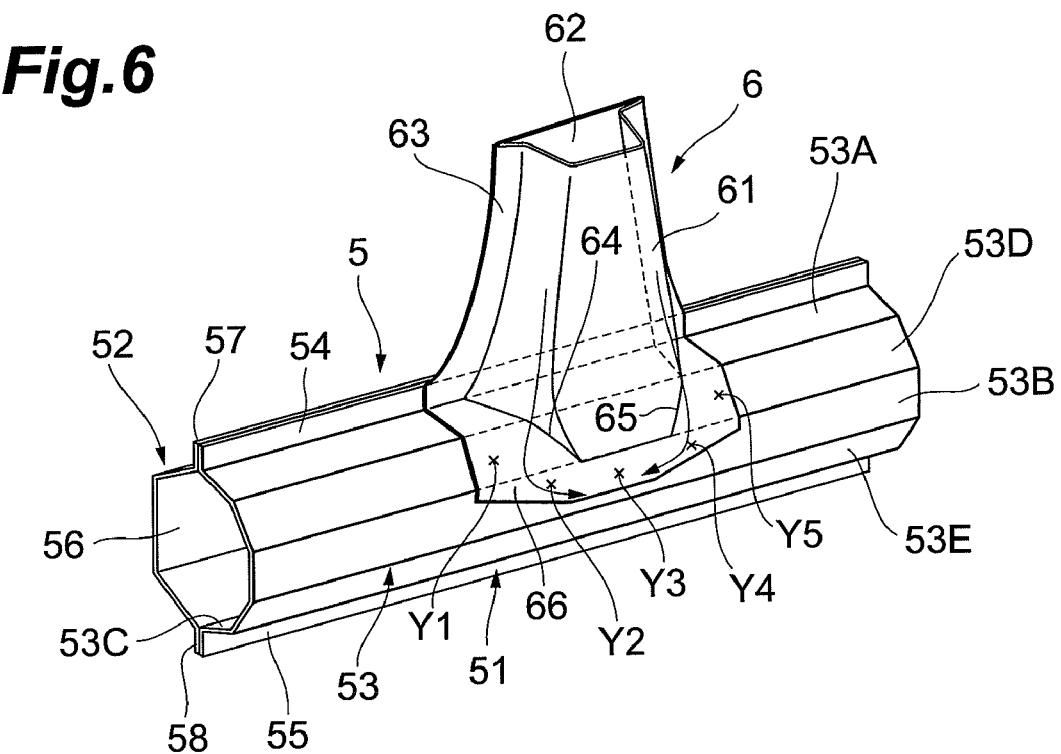
FIG. 6 is a perspective view illustrating the side part structure of the vehicle according to a third embodiment.

Next, a third embodiment of the invention will be described. FIG. 6 is a perspective view illustrating the side part structure of the vehicle according to the third embodiment. As shown in FIG. 6, the side part structure of the vehicle according to the embodiment includes a rocker 5 that extends in the longitudinal direction of the vehicle. Further, the side part structure of the vehicle includes a center pillar 6 that extends in the vertical direction of the vehicle. The center pillar 6 extends from the side part of the vehicle in the vertical direction. Further, the lower end of the center pillar 6 is connected to the rocker 5.

As in the first embodiment, the rocker 5 includes a rocker outer member 51 and a rocker inner member 52, and the rocker outer member 51 includes the rocker outer member body 53. The upper and lower portions of the rocker outer member body 53 are respectively provided with an outer upper flange 54 and an outer lower flange 55.

Further, the rocker inner member 52 includes a rocker inner member body 56, and the upper and lower portions of the rocker inner member body 56 are respectively provided with an inner upper flange 57 and an inner lower flange 58. The rocker 5 is formed by welding the rocker outer member 51 and the rocker inner member 52 to each other at the upper flanges 54 and 57 and the lower flanges 55 and 58.

Five surfaces are formed at the outer surface of the rocker outer member body 53 of the rocker 5, and the rocker outer member body 53 includes an upper outer surface 53D and a lower outer surface 53E as slope surfaces in addition to an upper surface 53A, a side surface 53B, and a lower surface 53C. The upper outer surface 53D is formed between the upper surface 53A and the side surface 53B, and the lower outer surface 53E is formed between the side surface 53B and the lower surface 53C.

Further, the center pillar 6 includes a pillar outer member 61 that is disposed at the outside of the vehicle and has a substantially U-shaped cross-section and a pillar inner member 62 that is disposed at the inside of the vehicle. The pillar outer member 61 and the pillar inner member 62 both extend in the vertical direction. Further, the side edge of the pillar outer member 61 is provided with a vertical flange member 63. The vertical flange member 63 also extends in the vertical direction.

The vertical flange member 63 is integrated with the pillar outer member 61, and the pillar inner member 62 and the vertical flange member 63 are welded to each other, so that the pillar outer member 61 and the pillar inner member 62 are bonded to each other. Further, the inner surface of the vehicle at the lower end of the pillar inner member 62 is bonded by welding to the outer upper flange 54 of the rocker 5.

Furthermore, the lower end of the pillar outer member 61 is provided with two ridge lines, that is, a front ridge line 64 and a rear ridge line 65 respectively located at the front and rear sides of the vehicle. As in the first embodiment, the front ridge line 24 and the rear ridge line 25 are both formed toward the center portion of the width direction of the center pillar and become close to each other as they go downward.

Further, the lower end of the pillar outer member 61 is provided with a lower flange 66. The lower flange 66 is disposed to cover a part of the side surface 53B, the upper outer surface 53D, and the upper surface 53A of the rocker outer member body 53. Moreover, the lower flange 66 is fixed to the upper outer surface 53D and the side surface 53B of the rocker outer member body 53 at a plurality of, in the embodiment, five welding points Y1 to Y5.

Among the welding points Y1 to Y5 of the lower flange 66 and the rocker outer member body 53, the first welding point Y1 and the fifth welding point Y5 are disposed at the upper outer surface 53D of the rocker outer member body 53. Further, the first welding point Y1 is disposed at the front side of the pillar outer member 61 of the center pillar 6, and the fifth welding point Y5 is disposed at the rear side of the pillar outer member 61 of the center pillar 6.

Furthermore, the second welding point Y2, the third welding point Y3, and the fourth welding point Y4 are all disposed at the side surface 53B of the rocker outer member body 53. Among these, the third welding point Y3 is disposed at the substantially center position of the width direction of the center pillar 6 at the outside of the center pillar 6. Further, the second welding point Y2 is disposed between the first welding point Y1 and the third welding point Y3, and the fourth welding point Y4 is disposed between the third welding point Y3 and the fifth welding point Y5.

In the side part structure of the vehicle according to the embodiment having the above-described configuration, when a side collision occurs in the vehicle, collision energy is input to the center pillar 6. The collision energy input to the center pillar 6 is transmitted to the rocker 5 in the form of a load, and is distributed to the entire vehicle body through the rocker 5.

Here, as in the first embodiment, the front ridge line 64 and the rear ridge line 65 of the center pillar 6 are both formed toward the center portion of the width direction of the center pillar 6 and become close to each other as they go downward. For this reason, since the buckling point causing the buckling of the rocker 5 is located at the substantially center position of the width direction of the center pillar 6, the buckling of the rocker 5 may be appropriately suppressed by the center pillar 6.

Moreover, in the embodiment, the lower flange 66 of the center pillar 6 is also fixed by welding to the upper outer surface 53D which is another slope surface of the rocker outer member body 53 in addition to the side surface 53B of the rocker outer member body in the rocker 5. For this reason, the load transmitted from the center pillar 6 to the rocker 5 may be reliably made to concentrate on the center portion of the width direction of the center pillar 6.

On the other hand, in the second embodiment, the bead 39 is provided as the weak portion, but may be formed in a different manner. For example, the weak portion may be formed in a manner such that the thickness of the weak portion is thinner than those of the other portions. Alternatively, the weak portion may be formed by a notch. Further, the weak portion may be formed in a manner such that the portion other than the weak portion is subjected to tempering or the like to improve the rigidity thereof.

INDUSTRIAL APPLICABILITY

The invention relates to a side part structure of a vehicle, and particularly, may be used in a side part structure of a vehicle at a bonding portion between a center pillar and a rocker member.

The invention claimed is:

1. A side part structure of a vehicle comprising:
a center pillar which extends from a side part of a vehicle in the vertical direction; and
a rocker which is connected to the lower end of the center pillar and extends in the longitudinal direction,
wherein a portion bonded to the rocker in the center pillar is provided with two ridge lines respectively located at the front and rear sides of the vehicle, and
wherein the two ridge lines are formed to move close to each other as they go downward toward a center portion of the width direction of the center pillar.

2. The side part structure of a vehicle according to claim 1, wherein a weak portion used as a start point causing buckling of the rocker is formed at a lower position at the outside of the width direction of the vehicle and within a connection range of the center pillar in the rocker.

3. The side part structure of the vehicle according to claim 2, wherein the weak portion is a bead formed in the rocker.

4. The side part structure of the vehicle according to claim 2, wherein the weak portion is formed as a thin plate of which the thickness is thinner than those of the other portions in the rocker.

* * * * *